US005872875A

United States Patent [19]

Halloran et al.

[11] Patent Number: 5,872,875

[45] Date of Patent: Feb. 16, 1999

[54] HYDRODYNAMIC SHAFT BEARING WITH CONCENTRIC OUTER HYDROSTATIC BEARING

[75] Inventors: John D. Halloran, East Amherst; Robert M. Kolodziej, Varysburg; Gerald K. Mruk, West Seneca, all of N.Y.

[73] Assignee: Cooper Cameron Corporation, Houston, Tex.

[21] Appl. No.: 988,845

[22] Filed: Dec. 11, 1997

[51] Int. Cl.[6] .......... F16C 32/06

[52] U.S. Cl. .......... 384/99; 384/119

[58] Field of Search .......... 384/99, 100, 114, 384/119

[56] References Cited

U.S. PATENT DOCUMENTS

| | | |
|---|---|---|
| 2,660,484 | 11/1953 | Gerald et al. . |
| 2,660,485 | 11/1953 | Gerard . |
| 2,663,977 | 12/1953 | Gerard et al. . |
| 2,690,936 | 10/1954 | Cameron . |
| 2,921,533 | 1/1960 | Williams . |
| 3,121,596 | 2/1964 | Price . |
| 3,365,958 | 1/1968 | Bard et al. . |
| 3,456,992 | 7/1969 | Kulina . |
| 3,471,205 | 10/1969 | Farrron et al. . |
| 3,510,175 | 5/1970 | Dee . |
| 3,510,176 | 5/1970 | Dee . |
| 3,589,782 | 6/1971 | Le Breton . |
| 3,647,272 | 3/1972 | Dee . |
| 3,685,874 | 8/1972 | Gerard . |
| 3,726,573 | 4/1973 | Unmo . |
| 3,746,328 | 7/1973 | Martt . |
| 3,814,554 | 6/1974 | Jansson et al. . |
| 3,863,996 | 2/1975 | Raimondi . |
| 3,899,222 | 8/1975 | Mendelevsky et al. . |
| 3,929,394 | 12/1975 | Hackett et al. . |
| 3,934,947 | 1/1976 | Walter et al. . |
| 3,994,541 | 11/1976 | Geary et al. . |
| 4,026,612 | 5/1977 | Goloff . |
| 4,090,743 | 5/1978 | Suzuki et al. . |
| 4,097,094 | 6/1978 | Gardner . |
| 4,365,849 | 12/1982 | Halloran . |
| 4,793,722 | 12/1988 | Jensen .......... 384/99 |
| 5,201,585 | 4/1993 | Gans et al. .......... 384/99 |
| 5,215,384 | 6/1993 | Maier .......... 384/99 |
| 5,651,616 | 7/1997 | Hustak et al. . |

FOREIGN PATENT DOCUMENTS

| | | |
|---|---|---|
| 805824 | 12/1958 | United Kingdom . |

*Primary Examiner*—Thomas R. Hannon
*Attorney, Agent, or Firm*—Frohwitter

[57] ABSTRACT

A bearing assembly comprises an outer bearing member having a cylindrical bore therethrough and a cylindrical inner bearing member extending coaxially within the bore in the outer bearing member, the inner bearing member having a cylindrical bore therethrough for accepting a rotating shaft. A first conduit is provided for supplying fluid to the bore in the outer bearing member to form a hydrostatic bearing between the inner bearing member and the outer bearing member, the first conduit comprising a passageway through the inner bearing member having four openings into the bore in the outer bearing member, the openings being arranged into pairs, the openings in each pair being in opposing regions of the bore. A second conduit is provided for independently supplying fluid to the bore in the inner bearing member to form a hydrodynamic bearing between the inner bearing member and a shaft located in the bore in the inner bearing member, the second conduit comprising a passageway having two openings into the bore in the inner bearing member, the openings being in opposing regions of the bore.

30 Claims, 4 Drawing Sheets

HYDRODYNAMIC SHAFT BEARING WITH CONCENTRIC OUTER HYDROSTATIC BEARING

FIELD OF INVENTION

The present invention relates to a bearing assembly for supporting a rotating shaft. In particular, the present invention concerns a bearing assembly in which the rotating shaft is supported by means of a hydrodynamic bearing, the assembly further comprising a hydrostatic bearing.

BACKGROUND OF INVENTION

An effective bearing assembly is one which, when in use for supporting a rotating shaft, allows the shaft to rotate as freely as possible, whilst providing the necessary support for the rotating shaft. In addition, the bearing assembly should accommodate and dampen vibration of the shaft. The performance of a bearing assembly becomes more important as the speed of rotation of the shaft being supported increases. The design and characteristics of bearing assemblies for supporting shafts in equipment such as a centrifugal compressor is critical if the shaft is to be allowed to rotate at the very high speed required and if the bearing is to function well over a wide range of speeds of rotation, for example during start-up and shut-down of the rotating equipment. Squeeze-film bearings have been employed for supporting shafts rotating at high speed. The bearing accommodates vibration of the shaft by using a film of fluid, sometimes in combination with one or more centering springs, to dampen the vibration. Examples of hydrostatic bearings are disclosed in U.S. Pat. Nos. 3,121,596, 3,994,541, 4,097,094, 4,392,751 and 3,863,996.

U.S. Pat. No. 2,921,533 discloses a bearing assembly for use in a pump in which, during start-up of the pump, the bearing acts as a hydrodynamic type of bearing while the fluid pressure available is too low for a hydrostatic type of bearing. Thereafter, once the normal fluid working pressure has been obtained, the bearing acts as a hydrostatic bearing.

A significant improvement in high-speed bearing design was made by the introduction of the hydrodynamic shaft bearing with a concentric outer hydrostatic bearing. Such a bearing is disclosed in U.S. Pat. No. 4,365,849. This bearing assembly employs both a hydrodynamic bearing and a hydrostatic squeeze-film bearing. The rotating shaft being supported is located in a cylindrical bore in a cylindrical inner bearing member. The inner bearing member is, in turn, located within a cylindrical bore in an outer bearing member. When in use, fluid is supplied to the cylindrical bore in the outer bearing member by way of passageways extending through the outer bearing member itself. In this way, a hydrostatic squeeze-film bearing is established between the surface of the bore in the outer bearing member and the outer surface of the inner bearing member. Fluid flows from this hydrostatic bearing through passageways in the inner bearing member to the cylindrical bore in which the shaft is located. The fluid entering the bore in the inner bearing member forms a hydrodynamic bearing between the outer surface of the shaft and the surface of the bore in the inner bearing member. It is described in U.S. Pat. No. 4,365,849 that the inner hydrodynamic bearing may be designed so as to optimize the rotational support of the entire bearing system. In this way, the stiffness of the inner hydrodynamic bearing may be maximized to improve rotation and need not be reduced in order to provide a dampening effect to accommodate vibrations set up in the rotation shaft. The dampening effect is achieved using the outer hydrostatic squeeze-film bearing which can be optimized for that function. O-ring seals are provided between the inner and outer bearing members to maintain the pressure of the fluid in the hydrostatic squeeze-film and maintain the performance of the hydrostatic bearing.

The bearing assembly disclosed in U.S. Pat. No. 4,365,849 has achieved considerable commercial success, in particular in applications for supporting shafts rotating at high speed, for example centrifugal compressors. However, it has been found that in order to achieve optimum performance using this bearing assembly, the fluid supply pressure must be significantly higher than other, more conventional, bearing designs. While this in itself does not present a problem in many cases, it would be desirable to provide a bearing assembly which achieves the same high performance, but which does not require such high fluid supply pressures.

SUMMARY OF THE INVENTION

The present invention provides a bearing assembly comprising an outer bearing member having a cylindrical bore therethrough; a cylindrical inner bearing member extending coaxially within the cylindrical bore of the outer bearing member, the inner bearing member having a cylindrical bore therethrough for accepting a rotating shaft; a first conduit for supplying fluid to the surface of the bore in the outer bearing member to form a hydrostatic bearing between the surface of the bore and the outer surface of the inner bearing member; and a second conduit for independently supplying fluid to the cylindrical bore in the inner bearing member to form a hydrodynamic bearing between the surface of the cylindrical bore in the inner bearing member and the surface of a shaft in the said bore.

Surprisingly, it has been found that fluid may be supplied to the concentric outer hydrostatic bearing in parallel to the fluid supplied to the inner hydrodynamic bearing and still maintain the high performance of the overall bearing assembly in terms of both optimizing the shaft rotation and dampening the vibration of the shaft. In addition, such a bearing assembly provides the significant advantage of allowing the fluid supply pressure to be reduced to lower pressures. This in turn allows the bearing assembly to be employed in a great range of applications. Further, it has been found that the bearing assembly of the present invention dispenses with the need to provide seals in order to control the stiffness of the hydrostatic squeeze-film bearing. Typically, seals, such as elastomeric O-rings, are used in order to achieve the required stiffness of the fluid film in the hydrostatic bearing and, therefore, achieve the desired dampening effect. The elastomeric O-rings have a tendency to become deformed over time due to elastomeric creep. This, in turn, affects the stiffness of the hydrostatic fluid film in the bearing. The bearing assembly of the present invention may be operated without the presence of seals, such as elastomeric O-rings, to maintain the desired stiffness of the fluid film in the hydrostatic bearing.

In one embodiment, the first conduit for supplying fluid to the surface of the bore in the outer bearing member to establish the hydrostatic bearing comprises one or more passageways through the first bearing member, each passageway having an opening into the cylindrical bore of the outer bearing member. In a preferred embodiment, a passageway is provided in the inner bearing member which opens into the cylindrical bore in the outer bearing member. Preferably, a passageway having a plurality of openings into the bore in the outer bearing member is provided to form the first conduit. In such cases, the plurality of openings are arranged so as to provide a balanced, even supply of fluid to the cylindrical bore. Most preferably, the openings are present in an even number and arranged into one or more opposing pairs. In this way, fluid may be supplied to opposing regions of the surface of the bore in the outer bearing member. In this respect, the term "opposing" is used with reference to outer regions of the cylindrical bore in the outer bearing member to refer to regions which lie at either end of a straight line perpendicular to and passing through the central longitudinal axis of the bore.

The bearing assembly preferably comprises one or more chambers in an outer region of the bore in the outer bearing member formed between the outer bearing member and the inner bearing member, which chambers when full of fluid form part of the hydrostatic bearing. The chambers may be formed by appropriate shaping of the surface of the bore in the outer bearing member and/or the outer surface of the inner bearing member, for example, by one or a combination of one or more grooves, cavities or pockets formed in either the surface of the bore in the outer bearing member and/or the outer surface of the inner bearing member. Preferably, there are a plurality of such chambers. The plurality of chambers are preferably arranged equidistantly around the inner bearing member in order to provide a balanced bearing. More preferably, there is an even number of such chambers arranged into to one or more opposing pairs around the circumference of the bore. Again, the term "opposing" when used with respect to these chambers is a reference to two or more chambers lying at either end of a straight line perpendicular to and passing through the central longitudinal axis of the bore in the outer bearing member. Most preferably, the chambers are equal in number and correspond in position to the regions into which the aforementioned passageway opens and fluid may be supplied. In one embodiment, the first conduit comprises a passageway in the outer bearing member opening into each of the chambers. In a preferred embodiment, the first conduit comprises a passageway in the inner bearing member with openings into each of the chambers.

In contrast to the bearing assembly disclosed in U.S. Pat. No. 4,365,849, when the bearing assembly of the present invention is in use, fluid is supplied to the cylindrical bore in the inner bearing member independently of the fluid supply to the outer hydrostatic bearing. Accordingly, a second conduit is provided for supplying fluid to the cylindrical bore in the inner bearing member to form a hydrodynamic bearing around the outer surface of a shaft located in the bore. Preferably, the second conduit comprises a passageway through the inner bearing member, which passageway has an opening into the bore in the inner bearing member. More preferably, the second conduit comprises a passageway having a plurality of openings into opposing regions of the bore in the inner bearing member. Again the term "opposing" when used with respect to a region of the bore in the inner bearing member is a reference to regions lying at either end of a straight line perpendicular to and passing through the central longitudinal axis of the bore. In a preferred embodiment, a passageway extends through the outer bearing member, which passageway has an opening into the bore in the outer bearing member aligned with the opening of a passageway in the inner bearing member. The passageway in the inner bearing member comprises bores with openings forming the first and second conduits for supplying fluid to both the bore in the inner bearing member for forming the hydrodynamic bearing and the bore in the outer bearing member for forming the hydrostatic squeeze-film bearing.

The conduit for supplying fluid to the cylindrical bore in the inner bearing member to establish the hydrodynamic bearing preferably opens into a chamber formed between a shaft present in the said bore and the surface of the bore. In embodiments in which the conduit comprises a plurality of openings into the cylindrical bore, it is preferred that each opening has a corresponding chamber. In a preferred embodiment, the cylindrical bore in the inner bearing member has half cylinders slightly offset to each other, so as to provide a tapered chamber extending from each opening in the direction of intended rotation of the shaft.

In a further aspect, the present invention provides an apparatus comprising a rotatable shaft, this shaft being supported in a bearing assembly comprising an outer bearing member having a cylindrical bore therethrough; a cylindrical inner bearing member extending coaxially within the cylindrical bore of the outer bearing member, the inner bearing member having a cylindrical bore through which the rotatable shaft extends coaxially within the cylindrical bore; a first conduit for supplying fluid to the surface of the bore in the outer bearing member to form a hydrostatic bearing between the surface of the bore and the outer surface of the inner bearing member; and a second conduit for independently supplying fluid to the cylindrical bore in the inner bearing member to form a hydrodynamic bearing between the surface of the cylindrical bore in the inner bearing member and the surface of the shaft.

In still a further aspect, the present invention provides a method of supporting a rotating shaft comprising providing an inner bearing member having a bore through which the shaft extends; supplying fluid to the bore, thereby forming a hydrodynamic bearing; providing an outer bearing member having a bore therethrough, the inner bearing member being located in the bore in the outer bearing member; supplying fluid to the bore of the outer bearing member thereby forming a hydrostatic bearing; the hydrodynamic bearing being supplied with fluid independently of the hydrostatic bearing.

As noted above, the present invention proves a significant advantage in that the fluid may be supplied to both the hydrostatic and hydrodynamic bearings at relatively low pressure. Thus, fluid is preferably supplied to the bore in the outer bearing member to form the hydrostatic bearing at a pressure in the range of up to 200 psi. More preferably, fluid is supplied to the bore in the outer bearing member at a pressure of from 50 to 150 psi, more preferably around 100 psi. Likewise, fluid may be supplied to the bore in the inner bearing member forming the hydrodynamic bearing at a pressure in the range of up to 200 psi. More preferably, fluid is supplied to the bore in the inner bearing member to form the hydrodynamic bearing at a pressure of from 50 to 150 psi, more preferably around 100 psi.

In the method of the present invention, fluid is preferably supplied to opposing regions of the bore in the inner bearing member. Similarly, fluid is preferably supplied to opposing regions of the bore in the outer bearing member forming the hydrostatic bearing.

BRIEF DESCRIPTION OF THE DRAWINGS

The present invention will be more fully understood from the following description of preferred embodiments of the invention, having reference to the accompanying drawings, in which:

Referring to FIG. 1, a bearing assembly, generally indicated by the reference numeral 2, comprises a generally cylindrical outer bearing member 4. In use, the bearing assembly 2 is located within a bearing housing (not shown). Such bearing housings are well-known and understood in the art. The bearing housing comprises means to locate and secure the outer bearing member 4 in order to prevent the outer bearing member from rotating when the bearing assembly is in use. A cylindrical bore 6 extends through the outer bearing member 4. The central longitudinal axis of the cylindrical bore 6 is coincident with the central longitudinal axis of the outer bearing member 4. A generally cylindrical inner bearing member 8 extends within the cylindrical bore 6 in the outer bearing member 4. The inner bearing member 8 is coaxial with the outer bearing member 4 and the cylindrical bore 6 therethrough. A cylindrical bore 10 extends through the inner bearing member 8 and is coaxial therewith. The bearing assembly 2 shown in FIG. 1 is located about a shaft 12 and has the shaft 12 extending through the cylindrical bore 10 in the inner bearing member 8.

Figure 1:
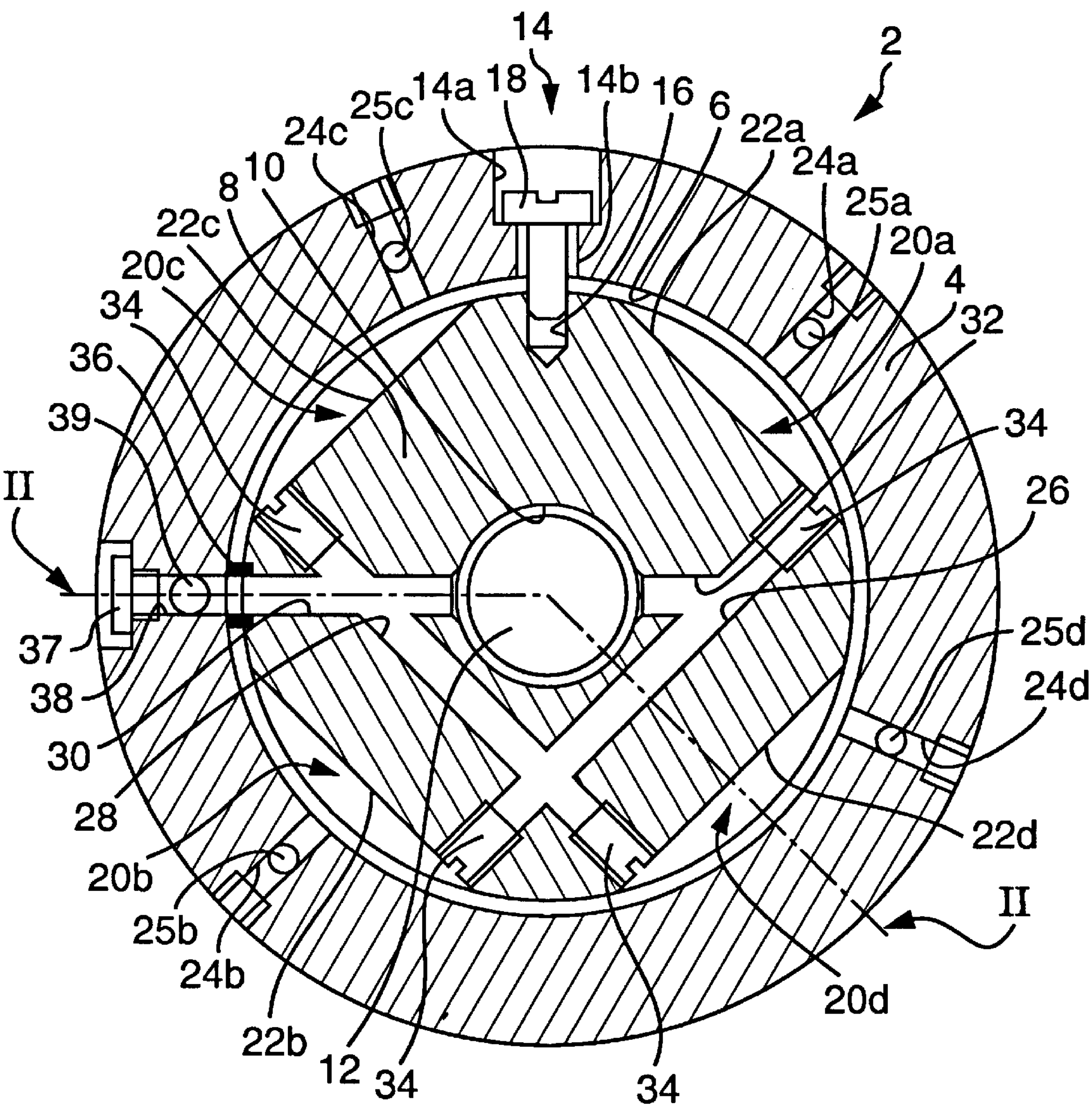
FIG. 1 is a cross-sectional representation of one embodiment of the bearing assembly according to the present invention located about a rotatable shaft.

The shaft 12 is free to rotate within the cylindrical bore 10 in the inner bearing member 8. The shaft 12 may be any suitable rotatable shaft requiring support. The shaft 12 may be the shaft of any suitable piece of rotating equipment. The bearing assembly 2 of the present invention finds particular application in the support of shafts intended for rotation at high speeds, such as the shafts of rotary and centrifugal compressors and the like.

A cylindrical bore, generally indicated by the reference 14, extends from the outer surface of the outer bearing member 4 radially inwards and opens into the cylindrical bore 6 in the outer bearing member 4. The bore 14 comprises an outer portion 14*a* of greater diameter and an inner portion 14*b* of lesser diameter. The inner bore portion 14*b* is formed with a thread. A blind cylindrical bore 16 extends radially inwards from the outer surface of the inner bearing member 8. With the inner bearing member 8 located within the cylindrical bore 6 in the outer bearing member 4, the blind bore 16 in the inner bearing member 8 aligns with the cylindrical bore 14 in the outer bearing member 4. A bolt 18 is threaded through the inner bore portion 14*b* and extends into the blind bore 16 in the inner bearing member 8. The bolt 18 serves to locate the inner bearing member 8 within the outer bearing member 4, maintaining the proper orientation of the inner bearing member 8 within the bearing assembly 2, and preventing the inner bearing member 8 from rotating under the action of the rotating shaft 12. The bolt 18 is a loose enough fit in the blind bore 16 in the inner bearing member 8 that the normal movement of the inner bearing member 8 under the action of the hydrostatic squeeze-film bearing formed between the inner and outer bearing members is not hindered.

A series of cylindrical bores 24*a, b, c, d* are arranged around the outer surface of the outer bearing member 4 and extend radially inwards to open into the cylindrical bore 6 in the outer bearing member 4. The outer end portion of each of the bores 24*a, b, c, d* is sealed with a threaded plug. Cylindrical bores 25*a, b, c, d* extend longitudinally from one end of the outer bearing member 4 and intersect with the bores 24*a, b, c, d* respectively and provide passageways for fluid to be fed from the end of the bearing assembly to each of the bores 24*a, b, c, d*. In order for the hydrostatic squeeze-film bearing between the inner bearing member 8 and the outer bearing member 4 to function properly, the fluid is supplied through a suitably sized restriction or orifice. This may be achieved by selecting an appropriate diameter for the bores 24*a, b, c* and *d*, or by the provision of a restriction in the bore (not shown).

Figure 2:
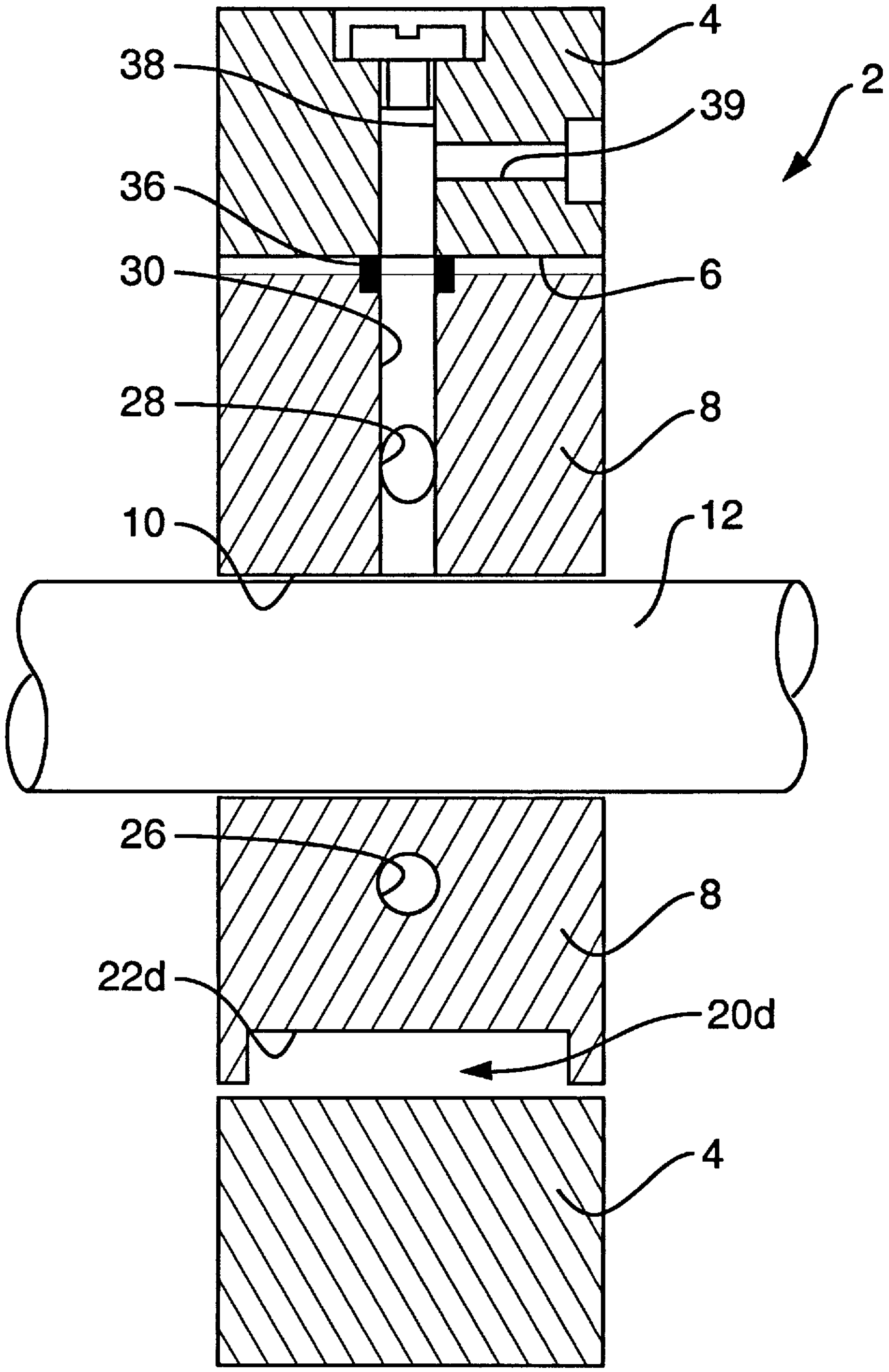
FIG. 2 is a cross-sectional view of the bearing assembly of FIG. 1 along the line II—II.

The cylindrical bore 6 within the outer bearing member 4 comprises two pairs of diametrically opposing outer regions, the first pair indicated by the reference numerals 20*a* and 20*b*, the second pair generally indicated by the reference numerals 20*c* and 20*d* which, when the bearing is in use, form the hydrostatic bearing. Each of the outer regions 20*a, b, c, d* comprises a chamber generally defined by a corresponding groove 22*a, b, c, d* in the outer surface of the inner bearing member 8 and the surface of the cylindrical bore 6 in the outer bearing member 4, as can be seen more clearly in FIG. 2. As shown in FIG. 2, the grooves 22*a, b, c, d* are rectangular in cross-section. The cylindrical bores 24*a, b, c, d* are arranged such that each bore corresponds to and opens into one of the chambers defined in the outer regions 20*a, b, c, d* in the cylindrical bore 6 in the outer bearing member 4.

It will be understood that the outer regions 20*a, b, c, d* of the cylindrical bore 6 in the outer bearing member 4 may vary in number and arrangement from that shown in FIGS. 1 and 2. Similarly, the number and arrangement of chambers in the outer regions 20*a, b, c, d*, together with the cylindrical bores 24*a, b, c, d* opening into the outer regions 20*a, b, c, d*, may also vary in both number and arrangement. Variations in the arrangement shown in FIGS. 1 and 2 in which the chambers in the outer regions 20*a, b, c, d* are formed are within the scope of the present invention. In particular, in addition to, or as an alternative to the grooves 22*a, b, c, d* in the outer surface of the inner bearing member 8, grooves, channels or pockets may be formed in the inner surface of the outer bearing member 4.

The inner bearing member 8 has a bore 26 extending from one end portion of the groove 22*a* through the inner bearing member 8 to the corresponding end portion of the groove 20*b*. A similar bore 28 extends from one end portion of the groove 22*c* through the body of the inner bearing member 8, intersecting orthogonally with the bore 26 and extending through to the corresponding end portion of the opposite groove 22*d*. A third bore 30 extends from the land between the grooves 22*b* and 22*c* in the outer surface of the inner bearing member 8 radially inwards, intersecting with the bore 28 and opening into the cylindrical bore 10 in the inner bearing member 8. A cylindrical bore 32 has an opening in the cylindrical bore 10 in the inner bearing member 8 opposite the opening of the bore 30 and extends radially outwards and intersects with the bore 26. The cylindrical bores 26, 28, 30 and 32 are positioned so as to have their central longitudinal axes lying in a plane extending perpendicular to the central longitudinal axis of the inner bearing member 8.

Each end portion of each of the bores 26 and 28 adjacent the grooves 22*a, b, c, d* in the outer surface of the inner bearing member 8 is threaded to accept a screw plug 34. The plugs 34 seal the ends of the bores 26 and 28. As an alternative to the threaded plugs, in order to effect better sealing of the bores 26 and 28, the plugs 34 may be pressed or driven into the bores so as to provide an interference fit. Suitable plugs for this duty are commercially available, an example being Lee plugs. With the plugs 34 in place, the bores 26, 28, 30 and 32 combine to form a passageway having two opposing openings into the cylindrical bore 10 in the inner bearing member 8 with a single opening in the outer surface of the inner bearing member 8 in the land between the grooves 22*b* and *c*. It will be understood that variations in the number and arrangement of the bores forming the passageway in the inner bearing member 8 and the number and positioning of openings into the cylindrical bore 10 in the inner bearing member 8 are possible and within the scope of the present invention.

A seal 36 is seated in a recess in the land between the grooves 22*b* and *c* in the outer surface of the inner bearing member 8 and extends around the opening of the bore 30. A cylindrical bore 38 extends radially inwards from the outer surface of the outer bearing member 4 and opens into the cylindrical bore 6 in the outer bearing member 4. The inner opening of the bore 38 is aligned with the opening of the bore 30 in the inner bearing member 8 in the land between the grooves 22*b* and *c*. The seal 36 contacts the surface of the cylindrical bore 6 in the outer bearing member 4 around the inner opening of the bore 38 in the outer bearing member 4. A cylindrical bore 39 extends longitudinally from one end face of the outer bearing member 4 and intersects with the bore 38 to provide a passageway for supplying fluid to the bore 38. The outer portion of the radial bore 38 is threaded to accept a screw plug 37 which acts to seal the end of the bore.

Figure 3:
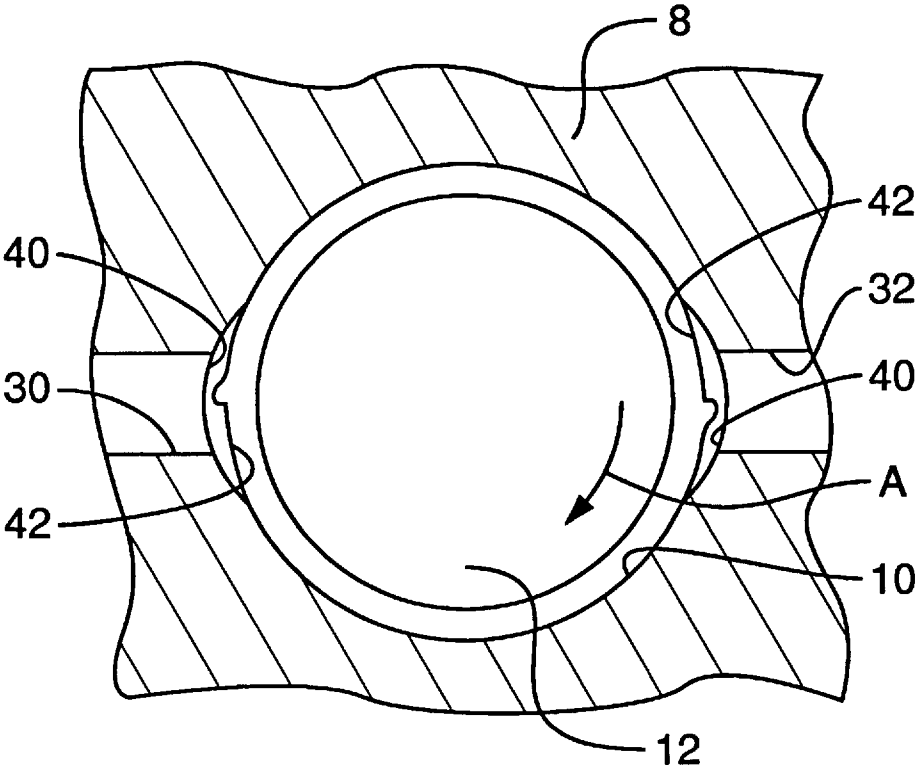
FIG. 3 is a detailed view of the central portion of the bearing assembly of FIG. 1.

FIG. 3 is a detailed view of the central portion of the inner bearing member 8, showing a rotatable shaft 12, extending within the cylindrical bore 10 in the inner bearing member 8. The intended direction of rotation of the shaft 12 is indicated by the arrow A. Each of the cylindrical bores 30, 32 in the inner bearing member 8 opens into the cylindrical bore 10. A longitudinal groove 40 is formed in the surface of the cylindrical bore 10 and extends across the opening of the bore 30, parallel to the central longitudinal axis of the inner bearing member 8. A similar groove 40 extends across the opening of the bore 32. A land 42 extends from each end of each groove 40 to the end of the cylindrical bore 10 of the inner bearing member 8. The cylindrical bore 10 in the inner bearing member 8 is formed with a slight offset between the cylindrical halves, such that a tapered chamber is defined between the shaft 12 and the surface of the cylindrical bore 10, the chamber extending in the direction of rotation A away from the opening of each of the bores 30 and 32.

In use, the bearing assembly 2 is supplied with a suitable lubricating fluid, typically lubricating oil, in two, independent manners. First, fluid is supplied to each of the cylindrical bores 24*a* to 24*d* via the bores 25*a, b, c, d* in the outer bearing member 4, which together form a conduit for supplying lubricating fluid to the cylindrical bore 6 in the outer bearing member 4. Typically, the fluid is supplied to each of the cylindrical bores 24*a* to 24*d* at a pressure in the range of up to 200 psi. More preferably, the fluid is supplied at a pressure of below 150 psi, typically from 50 to 150 psi. A particularly effective fluid supply pressure is from 80 to 100 psi. The fluid supply pressure for a given apparatus may well be governed by external factors, such as the maximum operating pressure of such items as fluid coolers, fluid filters, and the fluid supply system. It is an advantage of the bearing assembly of the present invention that a high level of hydrostatic bearing performance can be achieved and maintained using the lower fluid supply pressures typical of many rotating machines.

Fluid supply to each of the bores 24*a* to 24*d* enters the respective chamber in the outer region 20*a* to 20*d* of the cylindrical bore 6. The fluid also fills the annulus between the inner bearing member 8 and the outer bearing member 4. During operation, the fluid maintained in the annulus and the chambers in the outer regions 20*a* to 20*d* of the cylindrical bore 6 act as a hydrostatic squeeze-film bearing to dampen vibratory motion of the shaft 12. In general, fluid supplied to each of the chambers in the outer regions 20*a* to 20*d* will leave the bearing assembly by flowing through the annulus between the inner bearing member 8 and the outer bearing member 4. In response to movement of the inner bearing member 8 during the dampening of vibratory motion of the shaft, fluid will be forced to flow across the lands between the chambers in the outer regions 20*a* to 20*d*. The desired dampening effect may be adjusted and achieved by varying the supply pressure of fluid supplied to each of the bores 24*a* to 24*d*. Selection of the lubricating fluid itself will also be governed by the dampening duty to be performed in the hydrostatic bearing.

Second, a conduit for supplying fluid to the cylindrical bore 10 in the inner bearing member 8 is formed by the bores 26, 28, 30, 32, 38 and 39. Fluid is supplied to the cylindrical bore 38 via the longitudinal bore 39 in the outer bearing member 4 and flows radially inwards through the bore 38 past the seal 36 between the inner bearing member 8 and the surface of the cylindrical bore 6 in the outer bearing member 4 and enters the bore 30 in the inner bearing member 8. The fluid may be any suitable lubricating fluid, for example a lubricating oil, and is preferably the same fluid as fed to the cylindrical bores 24*a* to 24*d* to form the hydrostatic squeeze-film bearing described above. Once in the bore 30 in the inner bearing member 8, the fluid flow is divided and flows along the passageway formed by bores 26, 28, 30, and 32, to enter the cylindrical bore 10 in the inner bearing member 8 through both of the openings of bores 30 and 32. The fluid fills the grooves 40, the tapered chambers formed between the surface of the shaft 12 and the eccentricity in the cylindrical bore 10, and the annulus between the shaft 12 and the surface of the cylindrical bore 10 to form a hydrodynamic bearing. The fluid leaves the bearing assembly by flowing out the ends of the bearing through the annulus between the shaft 12 and the inner bearing member 8. Typically, the fluid is supplied to the cylindrical bore 38 in the outer bearing member 4 at a pressure in the range of up to 200 psi. More preferably, the fluid is supplied at a pressure of below 150 psi, typically from 50 to 150 psi. A particularly effective fluid supply pressure is from 80 to 100 psi. Again, the fluid supply pressure for a given apparatus may well be governed by external factors, such as the maximum operating pressure of such items as fluid coolers, fluid filters, and the fluid supply system. It is an advantage of the bearing assembly of the present invention that a high level of hydrodynamic bearing performance can be achieved and maintained using the lower fluid supply pressures typical of many rotating machines. The desired performance of the hydrodynamic bearing may be achieved by adjusting the supply or pressure of the fluid being fed to the bore 38 in the outer bearing member 4. The fluid itself may be selected according to the fluid properties required in order to achieve the required hydrodynamic bearing performance. An important feature of the bearing assembly 2 of the present invention is that the supply pressure of the fluids, and indeed the fluid itself, may be independently selected and adjusted for each of the hydrostatic squeeze-film bearing established between the outer bearing member 4 and the inner bearing member 8 and the hydrodynamic bearing established between the shaft 12 and the inner bearing member 8.

Figure 4:
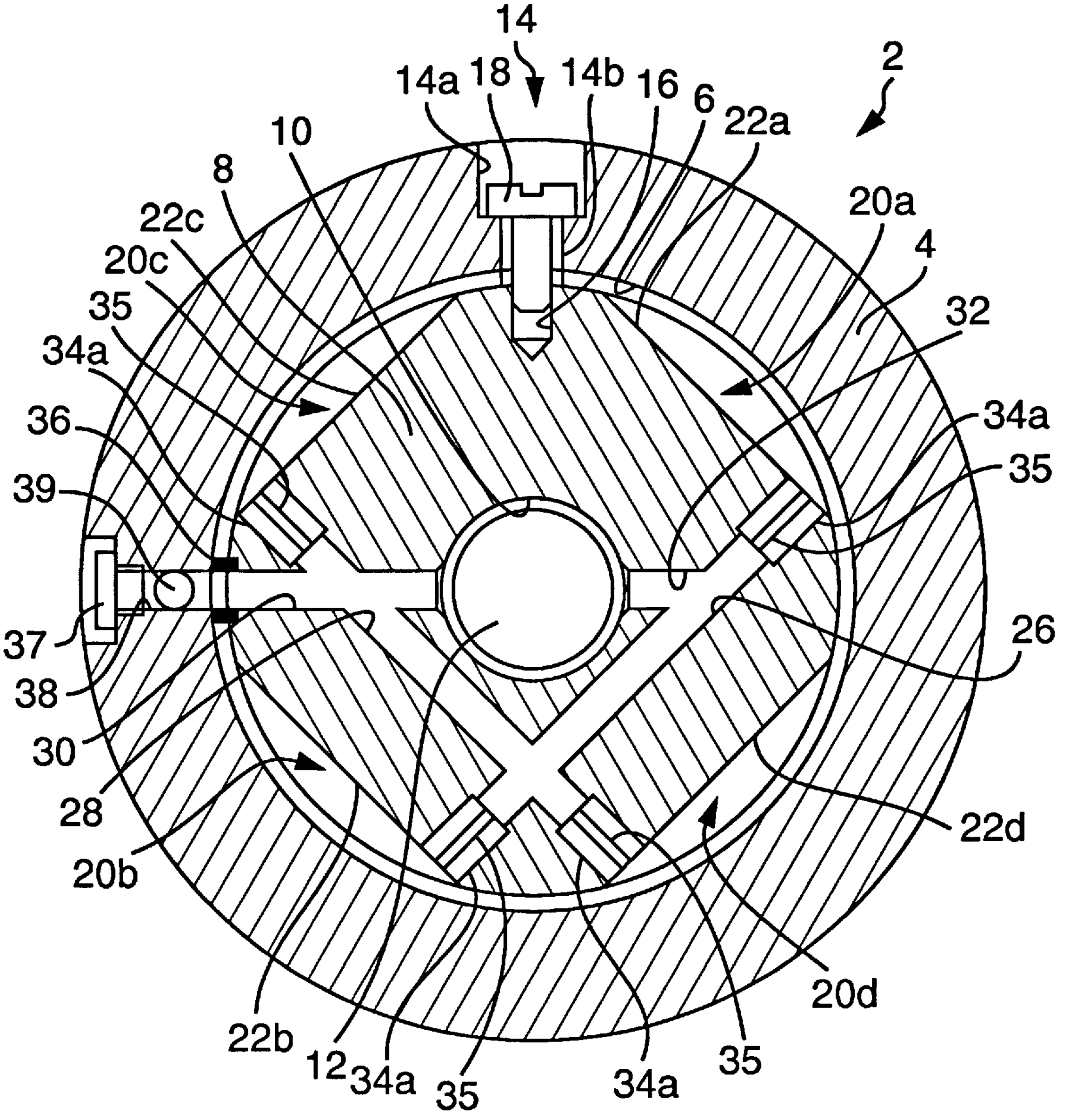
FIG. 4 is a cross-sectional representation of a preferred embodiment of the bearing assembly of the present invention.

Referring to FIG. 4, there is shown in this figure a preferred embodiment of the bearing assembly of the present invention. Features of the assembly of FIG. 4 corresponding to those of FIGS. 1 to 3 have been indicated using corresponding reference numerals. The bearing assembly of FIG. 4 is generally the same as that of FIG. 1. However, a preferred arrangement of the first and second conduits for supplying fluid to the hydrostatic squeeze-film bearing and the hydrodynamic bearing respectively is shown in FIG. 4. In the preferred assembly, a single bore 38 extends radially inwards through the outer bearing member 4, the inner opening of which is aligned with the opening of the bore 30 in the inner bearing member 8. Bores 26, 28, 30 and 32 are provided in the inner bearing member 8 as hereinbefore described. Plugs 34*a* are present in each end of the bores 26 and 28. As noted hereinbefore, the proper functioning of the hydrostatic squeeze-film bearing between the inner bearing member 4 and the outer bearing member 8 is achieved by supplying fluid to the bearing through an appropriately sized orifice. In the preferred embodiment shown in FIG. 4, each plug 34*a* in the ends of the bores 26 and 28 has a longitudinal bore 35 extending therethrough. In order to provide adequate sealing between the plugs 34*a* and the end portions of the bores 26 and 28 and prevent fluid by pass, it is preferred that the plugs 34*a* are an interference fit in the bores 26 and 28. Suitable plugs with longitudinal bores are available commercially, for example Lee plugs.

In use, fluid is supplied to the bearing assembly 2 of FIG. 4 via the radial bore 38. The fluid enters the bore 30 in the inner bearing member 8 past the seal 36 between the inner bearing member 8 and the outer bearing member 4. A first conduit comprises the bores 26, 28, 30 and 32, together with the bores 35 in the plugs 34*a*, for supplying fluid to the chambers in the outer regions 20*a, b, c* and *d* of the cylindrical bore 6 in the outer bearing member 4 to form a hydrostatic squeeze-film bearing. The diameter of the bores 35 in the plugs 34*a* is selected so as to provide the desired stiffness and dampening action of the hydrostatic squeeze-film bearing. The bores 26, 28, 30 and 32 provide a conduit for supplying fluid to the cylindrical bore 10 in the inner bearing member 8 to form a hydrodynamic bearing between the inner bearing member 8 and the shaft 12, as hereinbefore described. The pressures for the supply of fluid to the bore 38 in the outer bearing member 4 are typically in the range of up to 200 psi. More preferably, the fluid is supplied at a pressure of below 150 psi, typically from 50 to 150 psi. A particularly effective fluid supply pressure is from 80 to 100 psi.

While the particular embodiments of the bearing assembly of the present invention as here disclosed in detail are fully capable of obtaining the objects and advantages hereinstated, it is to be understood that they are merely illustrative of the presently preferred embodiments of the invention and that no limitations are intended by the details of construction or design herein shown other than as described in the appended claims.

What is claimed is:

1. A bearing assembly comprising:

an outer bearing member having a cylindrical bore therethrough;

a cylindrical inner bearing member extending coaxially within the cylindrical bore of the outer bearing member, the inner bearing member having a cylindrical bore therethrough for accepting a rotating shaft;

a first conduit for supplying fluid to the surface of the bore in the outer bearing member to form a hydrostatic bearing between the surface of the bore and the outer surface of the inner bearing member; and a second conduit for independently supplying fluid to the cylindrical bore in the inner bearing member to form a hydrodynamic bearing between the surface of the cylindrical bore in the inner bearing member and the surface of a shaft in the said bore.

2. A bearing assembly according to claim 1, wherein the first conduit comprises a passageway through the inner bearing member.

3. A bearing assembly according to claim 2, wherein the passageway comprises an even number of openings into the bore in the outer bearing member and arranged into one or more pairs for supplying fluid to opposing outer regions of the bore in the outer bearing member.

4. A bearing assembly according to claim 3, wherein the passageway comprises four openings.

5. A bearing assembly according to claim 1, further comprising a chamber formed between the outer bearing member and the inner bearing member.

6. A bearing assembly according to claim 5, wherein there are an even number of chambers between the outer bearing member and the inner bearing member arranged into one or more opposing pairs arranged around the circumference of the bore.

7. A bearing assembly according to claim 6, wherein the first conduit comprises a passageway in the inner bearing member having openings into each of the chambers.

8. A bearing assembly according to claim 5, wherein the chamber is formed by the surface of the bore in the outer bearing member and a groove in the outer surface of the inner bearing member.

9. A bearing assembly according to claim 1, wherein the second conduit comprises a passageway through the inner bearing member.

10. A bearing assembly according to claim 9, wherein the second conduit comprises a passageway having openings into opposing regions of the bore in the inner bearing member for supplying fluid to opposing outer regions of the bore in the inner bearing member.

11. A bearing assembly according to claim 1, wherein a passageway is provided through the outer bearing member having an opening into the bore in the outer bearing member, the inner bearing member comprising a passageway having an opening in the outer surface of the inner bearing member aligned with the opening of the passageway in the outer bearing member, the passageway in the inner bearing member forming the first and second conduits.

12. A bearing assembly according to claim 1, wherein the surface of the bore in the inner bearing member is shaped so as to form a chamber between the said surface and the surface of a shaft in the bore.

13. Apparatus comprising a rotatable shaft, the shaft being supported in a bearing assembly comprising:

an outer bearing member having a cylindrical bore therethrough;

a cylindrical inner bearing member extending coaxially within the cylindrical bore of the outer bearing member, the inner bearing member having a cylindrical bore through which the rotatable shaft extends coaxially with the cylindrical bore;

a first conduit for supplying fluid to the surface of the bore in the outer bearing member to form a hydrostatic bearing between the surface of the bore and the outer surface of the inner bearing member; and a second conduit for independently supplying fluid to the cylindrical bore in the inner bearing member to form a hydrodynamic bearing between the surface of the cylindrical bore in the inner bearing member and the surface of a shaft in the said bore.

14. Apparatus according to claim 13, wherein the first conduit comprises a passageway through the inner bearing member.

15. Apparatus according to claim 14, wherein the passageway comprises an even number of openings into the bore in the outer bearing member and arranged into one or more pairs for supplying fluid to opposing outer regions of the bore in the outer bearing member.

16. Apparatus according to claim 15, wherein the passageway comprises four openings.

17. Apparatus according to claim 13, further comprising a chamber formed between the outer bearing member and the inner bearing member.

18. Apparatus according to claim 17, wherein there are an even number of chambers between the outer bearing member and the inner bearing member arranged into one or more opposing pairs arranged around the circumference of the bore.

19. Apparatus according to claim 18, wherein the first conduit comprises a passageway in the inner bearing member opening into each of the chambers.

20. Apparatus according to claim 17, wherein the chamber is formed by the surface of the bore in the outer bearing member and a groove in the outer surface of the inner bearing member.

21. Apparatus according to claim 13, wherein the second conduit comprises a passageway through the inner bearing member.

22. Apparatus according to claim 21, wherein the second conduit comprises a passageway having openings into opposing regions of the bore in the inner bearing member for supplying fluid to opposing outer regions of the bore in the inner bearing member.

23. Apparatus according to claim 13, wherein a passageway is provided through the outer bearing member having an opening into the bore in the outer bearing member, the inner bearing member comprising a passageway having an opening in the outer surface of the inner bearing member aligned with the opening of the passageway in the outer bearing member, the passageway in the inner bearing member forming the first and second conduits.

24. Apparatus according to claim 13, further comprising a chamber formed between the surface of the bore in the inner bearing member and the surface of the shaft.

25. A method of supporting a rotating shaft comprising providing an inner bearing member having a bore through which the shaft extends;

supplying fluid to the bore, thereby forming a hydrodynamic bearing;

providing an outer bearing member having a bore therethrough, the inner bearing member being located in the bore;

supplying fluid to the bore of the outer bearing member thereby forming a hydrostatic bearing;

the hydrodynamic bearing being supplied with fluid independently of the hydrostatic bearing.

26. A method according to claim 25, wherein fluid is supplied to the bore in the inner bearing member at a pressure in the range of from 50 to 150 psi.

27. A method according to claim 25, wherein fluid is supplied to the bore in the outer bearing member at a pressure in the range of from 50 to 150 psi.

28. A method according to claim 25, wherein fluid is supplied to opposing regions of the bore in the inner bearing member.

29. A method according to claim 25, wherein the fluid is supplied to opposing regions of the bore in the outer bearing member.

30. A bearing assembly comprising:

an outer bearing member having a cylindrical bore therethrough;

a cylindrical inner bearing member extending coaxially within the bore in the outer bearing member, the inner bearing member having a cylindrical bore therethrough for accepting a rotating shaft;

a first conduit for supplying fluid to the bore in the outer bearing member to form a hydrostatic bearing between the inner bearing member and the outer bearing member, the first conduit comprising a passageway through the inner bearing member having a plurality of openings into the bore in the outer bearing member, the openings being arranged into pairs, the openings in each pair of openings being in opposing regions of the bore;

a second conduit for independently supplying fluid to the bore in the inner bearing member to form a hydrodynamic bearing between the inner bearing member and a shaft located in the bore in the inner bearing member, the second conduit comprising a passageway having two openings into the bore in the inner bearing member, the openings being in opposing regions of the bore.

* * * * *